Patented July 6, 1954

2,683,147

UNITED STATES PATENT OFFICE 2,683,147

QUATERNARY AMMONIUM COMPOUNDS OF BIS-TERTIARY AMINOALKOXY ALKANES

Emil Girod, Riehen, near Basel, Switzerland, assignor to J. R. Geigy A. G., Basel, Switzerland, a Swiss firm No Drawing. Application November 28, 1950, Serial No. 198,024

Claims priority, application Switzerland December 7, 1949

8 Claims. (Cl. 260—294.7)

This process concerns the production of bis-tertiary aminoalkoxy alkanes and their quaternary ammonium halides.

According to the present invention new bis-tertiary bases of the formula:

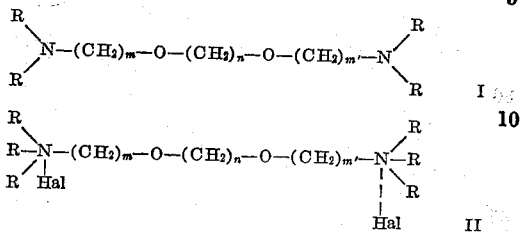

are provided wherein:

R represents the same or different alkyl radicals with 1-4 C atoms, particularly a methyl or an ethyl radical or else two R radicals together with the N atom represent a saturated heterocyclic radical with 5-6 members such as a pyrrollidino-, piperidino-, 2-methyl piperidino or morpholino ralical, Hal represents chlorine, bromine or iodine, $m$ and $m'$ represent integers from 2-4, and $n$ represents an integer of at least 2 and $m$, $n$ and $m'$ together represent a sum of at least 8.

In principle, the new compounds can be made up e. g. from glycols of the formula HO—(CH$_2$)$_m$—OH, OH—(CH$_2$)$_n$—OH, OH—(CH$_2$)$_{m'}$—OH and secondary or tertiary amines by methods known per se. Thus, the bis-tertiary bases can be produced for example by reaction of bis-halogen alkoxyalkanes of the general formula:

Hal—(CH$_2$)$_m$—O—(CH$_2$)$_n$—O—(CH$_2$)$_{m'}$—Hal   III with secondary aliphatic or heterocyclic amines of the formula:

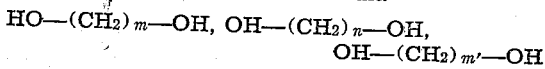

In the above and all further formulae R, Hal, $m$, $n$ and $m'$ have the meanings given above.

The bis-halogen akoxyalkanes of the general Formula III such as for example 1.2-bis-(δ-bromobutoxy)-ethane can be obtained by reaction of the corresponding bis-(ω-hydroxyalkoxy)-alkanes with phosphorus halides according to Ziegler and Holl Ann. 528, 152 (1937).

The bis-tertiary bis-aminoalkoxy alkanes can also be obtained by reaction of α,ω-alkane-diols of the general formula:

HO—(CH$_2$)$_n$—OH most advantageously in the form of their metal compounds (i. e. alcoholates) with 2 mols of tertiary aminoalkoxy halides of the general formula:

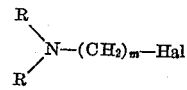

This process is suitable for instance for the production of bis-tertiary bis-(γ-aminopropoxy)-alkanes.

It is also possible to react α,ω-dihalogen alkanes of the general formula:

Hal—(CH$_2$)$_n$—Hal with 2 mols of tertiary aminoalcohols of the general formula:

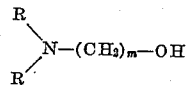

advantageously in the form of their metal compounds (i. e. alcoholates). This process has proved favourable when producing bis-tertiary bis-(δ-aminobutoxy)-alkanes.

When only 1 mol of a tertiary aminoalkyl halide or aminoalcohol is used in the two reactions given above, and then 1 mol of another analogous compound is added, unsymmetrical bis-tertiary bases, (e. g. 1-(δ-diethyl-aminobutoxy)-2-(β-dimethyl-amino-ethoxy)-ethane) are obtained.

Glycol, 1.3-propane-diol, 1.4-butane-diol, 1.5-pentane-diol, 1.6 - hexane - diol, 3-methyl-1.6-hexane-diol, 1.7-heptane-diol, 1.8-octane-diol, 1.9-nonane-diol and 1.10-decane-diol, etc. are to be understood as alkane-diols of the general formula:

HO—(CH$_2$)$_n$—OH

Their alcoholates can be reacted with, e. g. β-chloroethyl- or γ - bromopropyl - dimethyl-amine, -methyl-ethylamine, -methylpropylamine, -methyl-butylamine, -methyl-isobutylamine, -di-ethylamine, -ethyl - propylamine, -ethylbutyl-amine, -ethylisobutylamine, -dipropylamine, -propyl-butylamine, -propylisobutylamine, -di-butylamine, -butyl-isobutylamine, -di-isobutyl-amine, -methyl-isopropylamine, -methyl-secondary butylamine; N-(β-chlorethyl)-or N-(γ-bromopropyl)-pyrrolidine, -piperidine, -2-methyl-piperidine, -morpholine.

Also the bis-tertiary bis-aminoalkoxy alkanes can be produced from a di-primary diamine by tetra-alkylation. This process particularly comes into question when the bis-primary diamines are easily accessible for instance by adding 1 mol of an $\alpha,\omega$-diol to 2 mols of acrylonitrile and then reduction of the bis-($\gamma$-aminopropoxy)-alkanes as described in D. R. P. 734,475.

The quaternary ammonium compounds can be produced by two methods through the reaction of tertiary amines with halogen compounds. Either at least 2 mols of alkyl halides of the general formula:

are reacted with a bis-tertiary bis-aminoalkoxy alkane of the general formula:

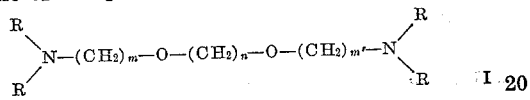    I or at least 2 mols of tertiary amines of the general formula:

are reacted with a bis-halogen alkoxyalkane of the general formula:

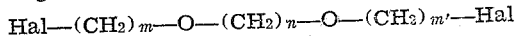

On using methyl iodide, the tertiary amines generally take up the halogen compounds at room temperature and under liberation of heat, but in most cases the reaction mixture must be heated to obtain a complete reaction. The reactions can be performed either in the presence or absence of suitable solvents. As such acetone, butanone, acetic ester, benzene, toluene, xylene, ether, dioxane, methanol, absolute ethanol or also an excess of alkyl halide come into question. Generally the iodine compounds are the most easy and chlorine compounds the most difficult to react. In the course of the reaction, quaternary ammonium iodides or bromides can be converted into the quaternary ammonium chlorides by means of silver chloride. Methyl iodide, methyl bromide, ethyl iodide and ethyl bromide are the most suitable alkyl halides. If necessary, the reactions can be performed in a pressure vessel.

When bis-primary diamines are used as starting products, alkylation and quaternisation may be performed in the same process step.

The new bis-tertiary bases produced according to this invention are liqiud substances capable of distillation in the vacuum without decomposition. The quaternary ammonium compounds are obtained generally as colourless crystalised products when pure. They are soluble in water with an almost neutral reaction.

The compounds can be used as pharmaceuticals, e. g. to influence the muscle tonus. For instance, quaternary ammonium halides from 1.10-bis-(aminoalkoxy)-decanes such as 1.10-bis-($\beta$ - triethyl - ammonium - ethoxy) - decane - di-iodide or -dibromide have a strong muscle relaxing action.

The following examples serve to illustrate the invention. The temperatures are in degrees centigrade and parts are always given as parts by weight in grammes.

Example 1

17.4 parts of 1.10-decane-diol, 30 parts of diethylaminoethyl chloride and 87 parts of abs. toluene are mixed and then heated to 90–100°. 8.2 parts of sodium amide finely ground with abs. toluene are then added in small portions at this temperature, and the whole mixture is stirred for a further 2 hours at the same temperature, after which it is boiled for 2 hours under reflux. After cooling, the base formed is converted into the chlorhydrate solution by stirring with excess 2n-hydrochloric acid. It is then washed with ether, filtered under suction after mixing with animal charcoal and treated with excess 30% caustic soda lye while cooling with ice. The base is extracted with ether and after the ether solution has been dried with potassium hydroxide, it is purified by fractional distillation. 1.10-bis-($\beta$-diethylamino-ethoxy)-decane is obtained as a colourless oil with a boiling point of 153–157° at 0.035 mm. pressure.

The same compound can also be obtained as follows: 17.4 parts of 1.10-decane-diol, 50 parts of diethylamino-ethyl chloride and 160 parts of 50% caustic soda lye are stirred for 6 hours at 100°. After diluting the bases so obtained in water, they are taken up in ether and then converted into the chlorhydrate solution by shaking the ether solution with 2n-hydrochloric acid. After extracting the aqueous chlorhydrate solution with ether, it is made alkaline with conc. caustic soda lye. The base which is precipitated is taken up in ether and dried. The pure base is obtained by fractional distillation of the ether extract.

Example 2

14 parts of the bis-tertiary base obtained according to Example 1 are warmed in a water bath at 50–60° for 14 hours with 80 parts of dry acetone and 19 parts of ethyl iodide. Filtration with suction is performed after cooling and the 1.10-bis-($\beta$-triethyl ammonium ethoxy)-decane-di-iodide obtained is purified, if desired, by recrystallisation from butanone and a little abs. methanol. In this process the salt is dissolved in as little hot methanol as possible and then enough hot butanone is added to cause a slight cloudiness. The solution is then cooled, filtered and the recrystallised product melts at 103°.

The corresponding dibromide, which is produced by gently warming the base with ethyl bromide in abs. ether, melts at 158°.

Example 3

19.5 parts of dimethylamine-ethanol in 430 parts of abs. toluene are treated while stirring with a solution of 5 parts of sodium in as little abs. methanol as possible. The methanol is then completely fractionally distilled off. If necessary, the residue is increased to about 200 parts by the addition of abs. toluene. A solution of 21.6 parts of 1.4-dibromobutane in 174 parts of abs. toluene are then added dropwise at boiling temperature over a period of 2 hours. The mixture is boiled for a further 6 hours under reflux and worked up as described in Example 1. 1.4-bis-($\beta$-dimethylamino-ethoxy)-butane boils at 86–89° at 0.15 mm. pressure.

Example 4

20 parts of methyl iodide are added dropwise while stirring to 11.6 parts of the base obtained according to Example 3 in 80 parts of dry acetone while cooling with ice. When the violent reaction has been completed, the reaction mixture is warmed for some hours under reflux whereupon the oily diquaternary ammonium iodide which precipitates transforms into crystals. On recrystallisation from a mixture of methanol and butanone, the di-iodomethylate is obtained. M. P. 235°.

*Example 5*

24.4 parts of 1.6-dibromohexane and 38 parts of δ-diethylamino-butanol are heated to 50–60° in 100 parts of toluene. 10.5 parts of sodium amide (finely ground in toluene) are slowly added at this temperature while stirring. Stirring is continued for a further 2 hours at 50–60° and thereafter for 24 hours at boiling temperature. After cooling, 2n hydrochloric acid is added carefully, the aqueous chlorhydrate solution is separated and extracted with ether. 30% of caustic soda lye is then added to the aqueous chlorhydrate solution, the oil which separates is taken up in ether and the ether solution is dried and distilled off. The bis-tertiary base, 1.6-bis-(δ-diethylamino-butoxy)-hexane is obtained by fractional distillation in a high vacuum. The compound boils at 157–160° at 0.07 mm. pressure.

*Example 6*

The corresponding diquaternary di-iodoethylate, i. e. 1.6-bis-(γ-triethyl-ammonium-butoxy)-hexane di-iodide, is obtained by heating the bis-tertiary diamine described in example 5 with ethyl iodide in acetone. It melts at about 99° and is somewhat hygroscopic.

*Example 7*

20.4 parts of 1.4-di-(γ-aminopropoxy)-butane are heated with 45 parts of 85% formic acid and 80 parts of 37.2% aqueous formaldehyde solution for 14 hours at 95–100° while stirring. (The starting product is obtained by catalytic hydrogenation of 1.4-di-(β-cyanoethoxy)-butane which has been obtained by adding 2 mols of acrylonitrile to 1 mol of 1.4-butane-diol). After cooling, 24 parts of conc. hydrochloric acid are added and the whole is evaporated to dryness in the vacuum. The residue is dissolved in water and on making the solution alkaline the base is precipitated and after drying in ether it is purified by distillation in the vacuum. 1.4-bis-(γ-dimethylamino-propoxy)-butane boils at 155–159° at 12 mm. pressure.

*Example 8*

If the base described in Example 7 is treated with a slight excess of methyl iodide in acetone according to Example 4, the corresponding di-iodomethylate is obtained. M. P. 133°.

*Example 9*

(Unsymmetrical compound)

34.8 parts of 1.10-decane-diol (0.2 mol), 34.4 parts of diethylaminoethyl chloride-hydrochloride (0.2 mol) and 107 parts of 50% caustic soda lye are stirred together for 6 hours at 100°. After cooling, the mixture is diluted with a little water, ethered out and the bases are transferred into the chlorhydrate solution by shaking the ether solution with 2n hydrochloric acid. The chlorhydrate solution is extensively extracted with ether and then made alkaline. The bases which are precipitated are then taken up in ether, dried with potassium carbonate and fractionally distilled. The monoether 10-(β-diethylamino-ethoxy)-decanol-(1) is obtained at a boiling point of 130–132° at 0.03 mm. pressure. The diether 1.10-bis(β-diethylamino-ethoxy)-decane is obtained as a by-product. This passes over at 155° at 0.03 mm. pressure.

3 parts of sodium amide (finely ground and suspended in toluene) are added in small portions to 13.2 parts of 10-(β-diethylamino-ethoxy)-decanol-(1) and 8 parts of γ-dimethylamino-propyl chloride in 50 parts of abs. toluene at 60–70° while stirring. The whole is kept at 60–70° for 2 hours and then boiled for a further 24 hours. After cooling, 2n-hydrochloric acid is added carefully, the aqueous chlorhydrate solution is separated, made alkaline and the base which is precipitated is ethered out. The ether solution is dried and the ether is distilled off. 1-(β-diethylamino-ethoxy)-10-(γ - dimethylamino-propoxy)-decane is obtained by distillation in the high vacuum. B. P. 144–149° at 0.03 mm. pressure.

Di-iodomethylate is obtained by warming with methyl iodide in acetone.

*Example 10*

9.5 parts of sodium amide (finely ground and suspended in toluene) are added to 34.8 parts of 1.10-decane-diol (0.2 mol), 30 parts of γ-diethylamino-propyl chloride (0.2 mol) in 100 parts of toluene at 50–60° while stirring. The whole is then held at 50–60° for 2 hours and then boiled for 24 hours. The basic end product is isolated in the usual way, and purified by fractional distillation. 10 - (γ - diethylamino - propoxy) - decanol-(1) is obtained. B. P. 140–141° at 0.045 mm. pressure.

This base is converted into 1-(β-dimethylamino-ethoxy)-10-(γ - diethylamino - propoxy)-decane by reaction with dimethylamino-ethyl chloride and sodium amide in toluene. B. P. 153–158° at 0.07 mm. pressure.

Di-iodomethylate is obtained by warming with methyl iodide in acetone.

The following bis-tertiary amines and quaternary ammonium compounds for example can be produced in the manner described above:

1. 1.2-bis-(γ-dimethylamino - propoxy) - ethane, B. P. (10 mm.) 139–144°. Di-iodomethylate, M. P. 175°.
2. 1.3-bis-(γ-dimethylamino - propoxy)-propane, B. P. (10 mm.) 155–161°. Di-iodomethylate, M. P. 171°.
3. 1.4 - bis - (β - diethylamino - ethoxy)-butane, B. P. (0.07 mm.) 108°. Di-iodoethylate, M. P. 184°.
4. 1.4-bis(β - piperidino - ethoxy)-butane, B. P. (0.4 mm.) 163–164°. Di-iodomethylate, M. P. 204°. Di-iodoethylate, M. P. 150–153°.
5. 1.4-bis-(γ - diethylamino - propoxy) - butane, B. P. (0.03 mm.) 117–118°. Di-iodoethylate, M. P. 145–148°.
6. 1.4-bis(δ-dimethylamino-butoxy)-butane, B. P. (0.1 mm.) 128–131°. Di-iodomethylate, M. P. 212–213°.
7. 1.5-bis - (β - dimethylamino-ethoxy)-pentane, B. P. (0.2 mm.) 103–105°. Di-iodomethylate, M. P. 145–146°.
8. 1.5 - bis - (β - diethylamino - ethoxy)-pentane, B. P. (0.09 mm.) 119–121°. Di-iodoethylate, M. P. 121–124°.
9. 1.6 - bis - (β - dimethylamino-ethoxy)-hexane, B. P. (12 mm.) 162–164°. Di-iodomethylate, M. P. 132°.
10. 1.6 - bis - (β - diethylamino - ethoxy)-hexane, B. P. (0.02 mm.) 110–112°. Di-iodoethylate, M. P. 119–120°.
11. 1.6 - bis - (β - morpholino - ethoxy) - hexane, B. P. (0.3 mm.) 203–204°. Di-iodomethylate, M. P. 38–139°.
12. 1.6 - bis - (γ - dimethylamino-propoxy)-hexane, B. P. (0.08 mm.) 119–123°. Di-iodomethylate, M. P. 207–209°.
13. 1.6-bis(γ - diethylamino - propoxy) - hexane B. P. (0.03 mm.) 133–135°. Di-iodomethylate, hygroscopic. Di-iodoethylate, hygroscopic.
14. 1.6 - bis - (γ - dibutylamino - propoxy)-hexane B. P. (0.04 mm.) 192–195°. Di-iodoethylate, M. P. 126–128°.
15. 1.6 - bis - (δ - dimethylamino - butoxy)-hexane, B. P. (0.08 mm.) 136–138°. Di-iodomethylate, M. P. 180–183°.
16. 1.6-bis-(β - dimethylamino-ethoxy)-3-methylhexane, B. P. (0.09 mm.) 114–115°. Di-iodomethylate, M. P. 160–161°.
17. 1.7 - bis - (β - dimethylamino - ethoxy) - heptane, B. P. (0.05 mm.) 138–141°. Di-iodomethylate, M. P. 142–145°.
18. 1.8-bis-(β - dimethylamino - ethoxy)-octane, B. P. (0.05 mm.) 142–144°. Di-iodomethylate, M. P. 135–137°.
19. 1.8 - bis-(β-diethylamino - ethoxy) - octane, B. P. (0.08 mm.) 156–158°. Di-iodoethylate, M. P. 111–112°.
20. 1.8-bis-(γ-diethylamino - propoxy) - octane, B. P. (0.05 mm.) 163–165°. Di-iodoethylate, M. P. 97–98°.
21. 1.9 - bis - (β - dimethylamino - ethoxy)-nonane, B. P. (0.06 mm.) 148–150°. Di-iodomethylate, M. P. 110–111°.
22. 1.9 - bis - (β - diethylamino - ethoxy)-nonane, B. P. (0.06 mm.) 154–159°. Di-iodoethylate, M. P. 123–125°.
23. 7.10 - bis - (β - dimethylamino - ethoxy)-decane, B. P. (0.04 mm.) 134–137°. Di-iodomethylate, M. P. 151°. Di-iodoethylate, M. P. 95°. Di-bromobutylate, M. P. 148–149°.
24. 1.10 - bis - (β - piperidino - ethoxy) - decane, B. P. (0.04 mm.) 159–168°. Di-iodoethylate, M. P. 112°.
25. 1.10 - bis - (β - morpholino - ethoxy) - decane, B. P. (0.15 mm.) 211–215°. Di-iodoethylate, M. P. 102°.
26. 1.10 - bis - (γ - dimethylamino - propoxy)-decane B. P. (0.02 mm.) 140–144°. Di-iodomethylate, M. P. 148–150°.
27. 1.10 - bis - (γ - diethylamino - propoxy)-decane, B. P. (0.03 mm.) 164–169°. Di-iodoethylate, M. P. 90–91°.
28. 1.10 - bis - (γ - dibutylamino - propoxy)-decane, B. P. (0.09 mm.) 230–231°. Di-iodoethylate, M. P. 86°.

29. 1.11 - bis - (β - dimethylamino - ethoxy)-undecane. Di-iodomethylate.
30. 1.12 - bis - (γ - diethylamino - propoxy)-dodecane. Di-iodoethylate.
31. 1.14 - bis - (β - diethylamino - ethoxy) - tetradecane. Di-iodoethylate.
32. 1.15 - bis - (δ - dimethylamino - butoxy)-pentadecane. Di-chloromethylate.
33. 1.16 - bis - (β - dimethylamino - ethoxy)-hexadecane. Di-iodoethylate.
34. 1.16 - bis - (γ - dimethylamino - propoxy)-hexadecane. Di-iodomethylate.
35. 1.18 - bis - (β - diethylamino - ethoxy) - octadecane. Di-bromethylate.
36. 1.20 - bis - (β - dimethylamino - ethoxy)-eicosane. Di-iodomethylate.
37. 1.4 - bis - (β - pyrrolidino - ethoxy) - butane. Di-chlorethylate.
38. 1.6 - bis - (γ - pyrrolidino - propoxy) - hexane. Di-iodomethylate.
39. 1.6 - bis - (β - [2' - methyl - piperidino]-ethoxy)-hexane. Di-iodomethylate.
40. 1.6 - bis - (δ - morpholino - butoxy) - hexane. Di-iodomethylate.
41. 1.10 - bis - (γ-pyrrolidino-propoxy) - decane. Di-bromethylate.
42. 1.12 - bis - (β - pyrrolidino - ethoxy) - dodecane. Di-iodethylate.
43. 1.16 - bis - (β - piperidino - ethoxy) - hexadecane. Di-iodomethylate.

What I claim is:
1. A compound of the general formula:

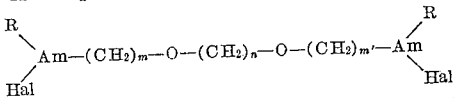

wherein Am represents a member selected from the group consisting of dialkylamino radicals wherein each alkyl group contains from 1–4 carbon atoms, the morpholino radical and 5- and 6-sided polymethylene imino radicals containing from 4 to 6 carbon atoms, R represents an alkyl radical containing from 1 to 4 carbon atoms, Hal represents a halogen atom of a molecular weight of at least 35, $m$ and $m'$ represent integers from 2 to 4, and $n$ represents an integer from 4 to 20.

2. A compound of the general formula:

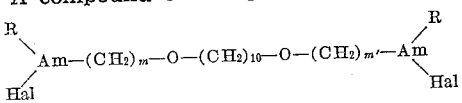

wherein Am represents a 5- to 6-sided polymethylene imino radical containing from 4 to 6 carbon atoms, R represents an alkyl radical containing from 1 to 4 carbon atoms, Hal represents a halogen atom of a molecular weight of at least 35 and $m$ and $m'$ represent integers from 2 to 4.

3. A compound of the general formula:

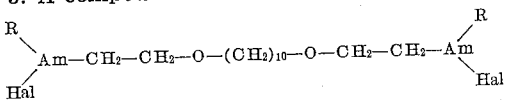

wherein Am represents a 5- to 6-sided polymethylene imino radical containing from 4 to 6 carbon atoms, R represents an alkyl radical containing from 1 to 4 carbon atoms and Hal represents a halogen atom of a molecular weight of at least 35.

4. A compound of the formula:

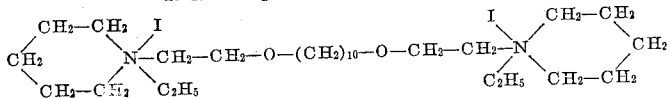

5. A compound of the general formula:

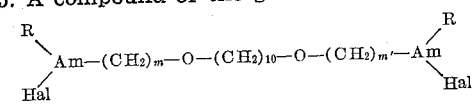

wherein Am represents a dialkylamino radical wherein each alkyl group contains from 1 to 4 carbon atoms, R represents an alkyl radical containing from 1 to 4 carbon atoms, Hal represents a halogen atom of a molecular weight of at least 35 and $m$ and $m'$ represent integers from 2 to 4.

6. A compound of the general formula:

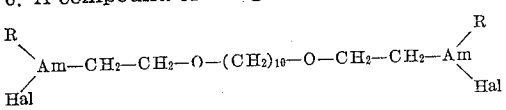

wherein Am represents a dialkylamino radical wherein each alkyl group contains from 1 to 4 carbon atoms, R represents an alkyl radical containing from 1 to 4 carbon atoms, and Hal represents a halogen atom of a molecular weight of at least 35.

7. A compound of the general formula:

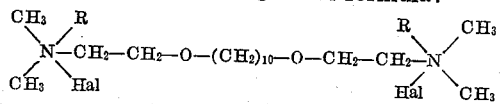

wherein R represents an alkyl radical containing from 1 to 4 carbon atoms and Hal represents a halogen atom of a molecular weight of at least 35.

8. A compound of the formula:

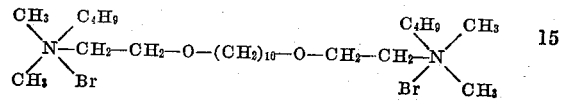

References Cited in the file of this patent

UNITED STATES PATENTS

| Number | Name | Date |
|---|---|---|
| 1,518,689 | Callsen | Dec. 9, 1924 |
| 2,137,314 | Ulrich et al. | Nov. 22, 1938 |
| 2,173,069 | Ulrich et al. | Sept. 12, 1939 |
| 2,292,479 | Reynolds et al. | Aug. 11, 1942 |
| 2,409,675 | Gresham | Oct. 22, 1946 |
| 2,412,209 | Dickey et al. | Dec. 10, 1946 |
| 2,498,195 | Ballard et al. | Feb. 21, 1950 |
| 2,544,076 | Fourneau | Mar. 6, 1951 |
| 2,560,280 | De Benneville | July 10, 1951 |

FOREIGN PATENTS

| Number | Country | Date |
|---|---|---|
| 879,812 | France | Mar. 5, 1943 |